United States Patent [19]
Lee

[11] Patent Number: 5,397,025
[45] Date of Patent: Mar. 14, 1995

[54] PRODUCT DISPENSING AND STORAGE DEVICE

[75] Inventor: Charles H. Lee, Irvine, Calif.

[73] Assignee: National Superior Vending, Inc., Anaheim, Calif.

[21] Appl. No.: 199,616

[22] Filed: Feb. 22, 1994

[51] Int. Cl.⁶ ............................................. B65G 59/00
[52] U.S. Cl. .................................... 221/299; 221/298; 221/194
[58] Field of Search ............... 221/298, 299, 287, 290, 221/291, 292, 293, 301, 194, 133, 131, 124, 251

[56] References Cited

U.S. PATENT DOCUMENTS

| | | | |
|---|---|---|---|
| 3,357,537 | 12/1967 | Ring | 221/298 |
| 4,190,179 | 2/1980 | Moss et al. | 221/299 |
| 4,269,325 | 5/1981 | Durham et al. | 221/194 |
| 4,405,059 | 9/1983 | Kull | 221/298 |
| 4,917,264 | 4/1990 | Gasiel et al. | 221/124 |

FOREIGN PATENT DOCUMENTS 1463435  3/1989  U.S.S.R. ............................ 221/299

Primary Examiner—Kenneth W. Noland
Attorney, Agent, or Firm—Lewis Anten; Amedeo Ferraro

[57] ABSTRACT

An improved mechanical product dispensing and storage device for storing and dispensing rollable products such as canned beverages or other cylindrical or spherical products is disclosed. The products to be dispensed are stored on a feed path and roll toward a discharge end of the feed path. Located near the discharge end is a dispensing mechanism comprising of a rotatable shaft extending in the direction of and positioned at an angle to the feed path. Extending from the shaft are a pair of asymmetrical cams which rotate with the shaft to operate a pair of spring loaded separator doors used to control the dispensing of the products. A self-locking mechanism prevents the operation of the dispensing device when empty.

13 Claims, 3 Drawing Sheets

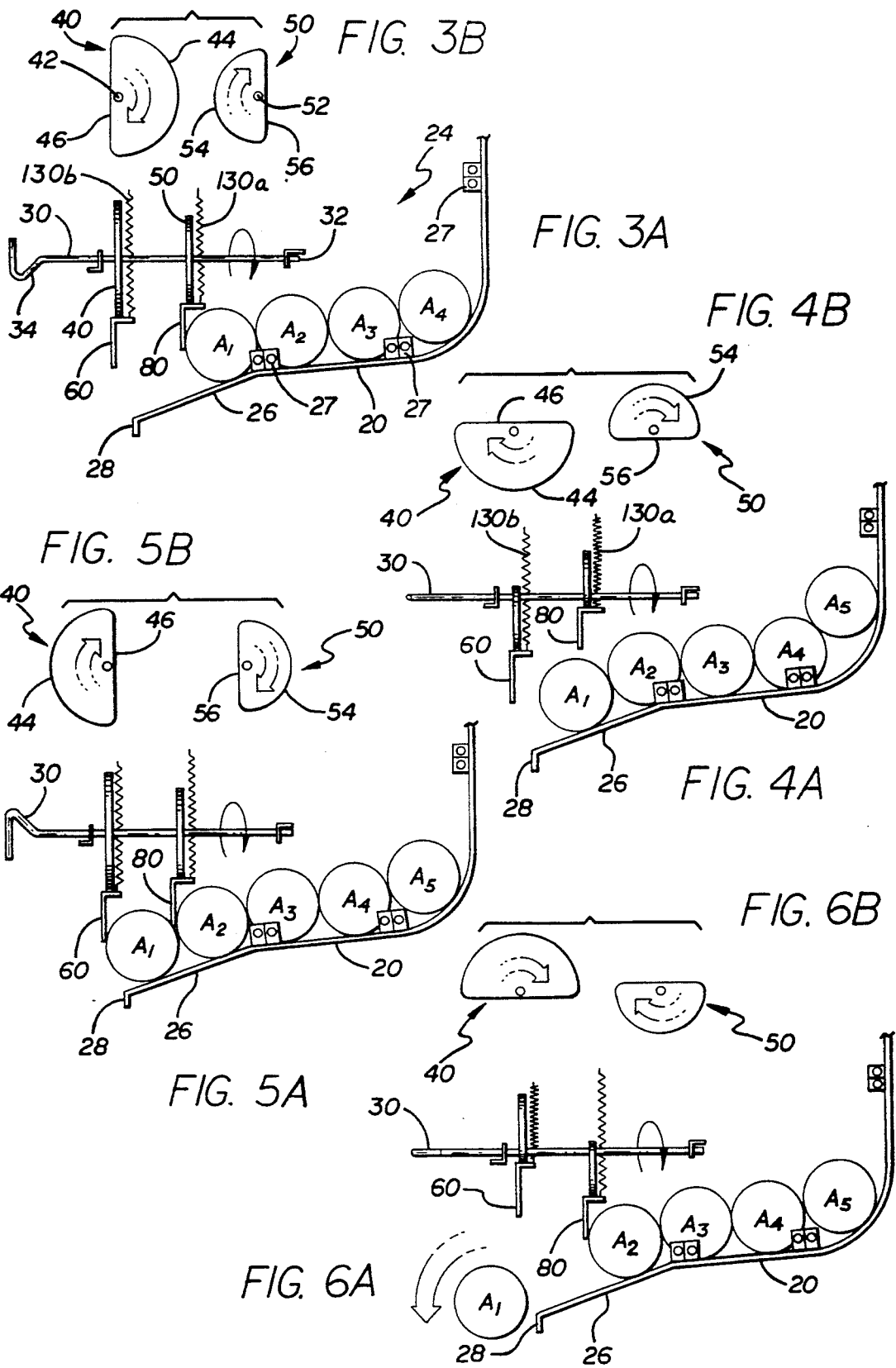

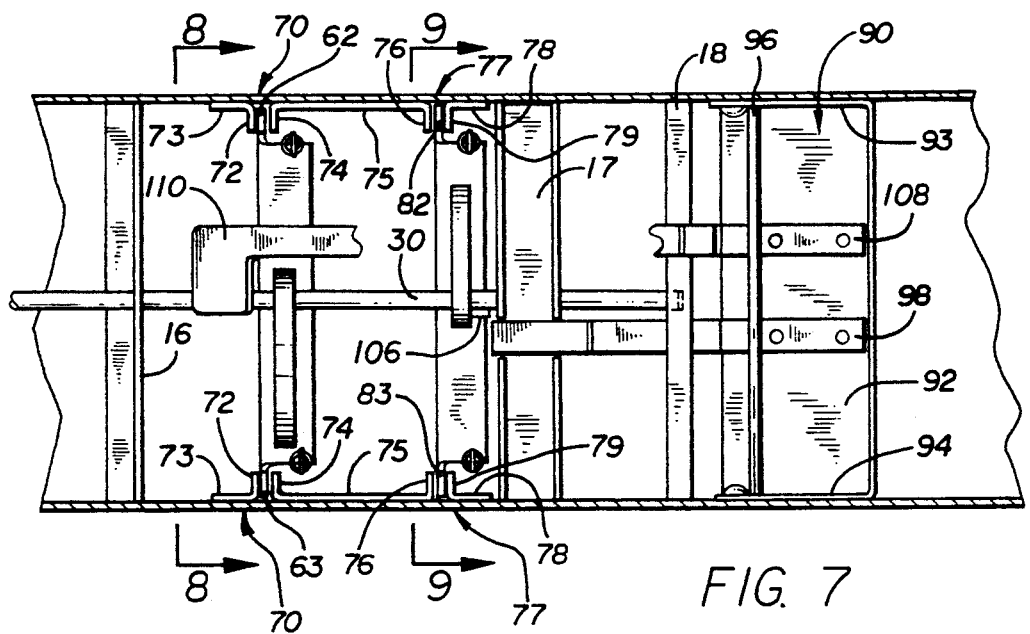
FIG. 7
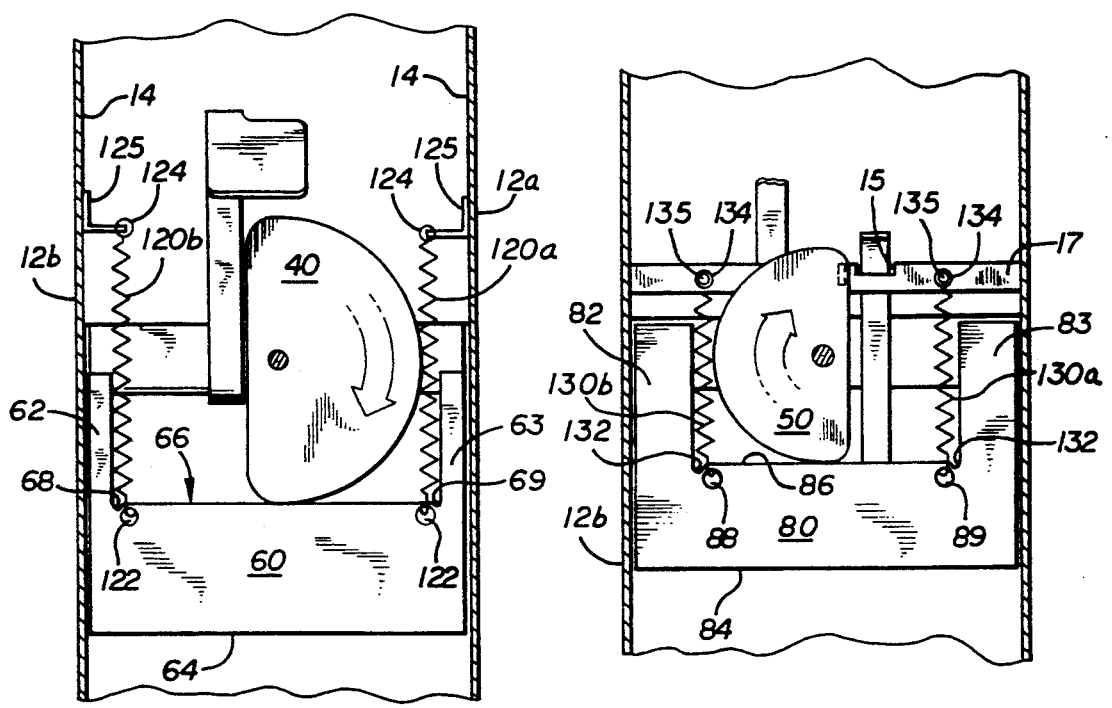
FIG. 8
FIG. 9

PRODUCT DISPENSING AND STORAGE DEVICE

BACKGROUND OF THE INVENTION

1. Field of the Invention

This invention relates to devices for storing and dispensing products, and more particularly to an improved product dispensing and storage device for storing and dispensing rollable spherical or cylindrical products such as canned beverages.

2. Description of the Related Art

Devices for dispensing and storing products, such as soda can and other types of vending machines, are well-known in the art. Typically, these devices are relatively complex, employing sophisticated mechanisms requiring electrical power for dispensing the product. For example, U.S. Pat. No. 4,269,325 issued to Durham et al. on May 26, 1981 teaches a can vending apparatus comprising an electrically operated mechanical dispensing mechanism having solenoid activated queuing means. Similarly U.S. Pat. No. 4,917,264 issued to Gasiel et al. on Apr. 17, 1990 teaches an article dispensing machine having a double serpentine feed path with an article dispensing mechanism at the ends of each feed path. The article dispensing mechanism comprises an electrically controlled motor driven shaft means positioned parallel to the plane of the feed path and has rotating finger units extending perpendicularly from the shaft means that make direct contact with the articles on the feed path to control the delivery of the products. The sophistication of these devices have resulted in increased manufacturing costs and in increased operating costs due to frequent and expensive maintenance to keep those devices in working order.

Attempts have also been made in the past to create a simple product dispensing device that avoids the problems experienced by more complex devices. However, these devices proved to have their own difficulties and limitations. For example, some of the problems frequently encountered by the more simple devices of the past include damage to the product being dispensed and jamming of the products as a result of malfunctions in the feeding system.

In particular, U.S. Pat. No. 4,190,179 issued to Moss et al. on Feb. 26, 1980 discloses a dispensing device having a "cam type" product delivery mechanism, wherein the product is released and urged from a delivery chute by a "cam" that rotates around a central shaft. The central shaft of the Moss device is parallel to the feed path and positioned beneath the feed path. As the rotating cam in Moss makes direct contact with the product to be dispensed, it is possible for the cam to create a jamming in the line, and in the event a product is jammed on the feed path it is possible for the product to be damaged by the cam itself as the cam rotates. Similarly, it is also possible for the mechanism that rotates the cam of the Moss device to be damaged by the presence of a jammed product on the feed path.

The devices of the past have also encountered problems with their locking systems for preventing the operation of the device when empty and were not thoroughly reliable and were prone to failure. The systems of the prior art also required electrical wiring, bulbs, and switches that added to chance of failure and increased the potential for electrical shortages.

Hence, although attempts have been made to create simpler dispensing devices, none have achieved increased reliability and cost effectiveness. Thus, there exists a present need for a simple product dispensing device that is inexpensive to manufacture, less likely to jam, inexpensive to operate and does not damage the product being dispensed.

SUMMARY OF THE INVENTION

The present invention discloses a simple mechanical product dispensing device for storing and dispensing rollable products such as canned beverages or other cylindrical or spherical products. The products to be dispensed are stored on a feed path within the product dispensing device and roll toward a discharge end of the feed path as a result of the inclination of the feed path which is at a raised angle from the discharge end of the product dispensing device.

Located near the discharge end is a dispensing mechanism comprising of a rotatable shaft extending in the direction of the feed path. The rotatable shaft is positioned at an angle to the horizontal plane of the feed path. Extending from the rotatable shaft are a primary cam and a secondary cam, each having an asymmetric circumference. The primary cam rotates with the shaft and is positioned so that it is near the discharging end of the feed path. The secondary cam also rotates with the shaft and is sufficiently spaced from the primary cam so as to accommodate a single article therebetween. The primary and secondary cams do not make contact with the product being dispensed.

Instead, the primary cam engages a spring activated primary separator door located near the discharging end of the feed path, which in its normal state is held in a closed position by the primary cam to block the feed path and prevents the discharge of any products located at the end of the feed path. Similarly, the secondary cam engages a spring activated secondary separator door which is sufficiently spaced from the primary separator door to accommodate a single product therebetween, and moves up and down in response to the rotation of the secondary cam. The secondary separator door serves to restrain any of the remaining products present on the feed path by blocking and restraining the product that is next in line to be dispensed as the first product is dispensed.

During the operation of the product dispensing device of the present invention, when the rotatable shaft is rotated, the primary and secondary cams also simultaneously rotate through sequential positions for controlling the respective positions of the primary and secondary separator doors. A complete dispensing cycle begins with the primary separator door also being held down in its normal closed position by the primary cam and the secondary separator door being held down in its normal closed position by the secondary cam.

As the shaft is rotated one quarter ($\frac{1}{4}$) of a turn, the primary separator door remains in its normal closed position being held down by the primary cam, and the secondary cam releases the secondary separator door so that the secondary separator door is raised by the springs and a product is released and rolls down the feed path to rest against the primary separator door.

As the shaft is rotated one half ($\frac{1}{2}$) of a turn, the primary separator door still remains in its closed position and the secondary separator door is again held down in the lowered closed position by the secondary cam so as to block the next in line products in the feed path.

As the shaft is rotated three quarters ($\frac{3}{4}$) of a turn, the primary cam releases the primary door and the primary door is raised by the springs. The product nearest to the discharge end of the feed path is released from the feed path, while the secondary door remains held in its closed position by the secondary cam to hold and restrain the next in line products and any other articles behind that article to prevent them from being discharged.

As the shaft is rotated a complete turn, the primary and secondary separator doors are restored to their normal lowered closed positions.

The product dispensing device of the present invention also includes a self-locking means for preventing the rotation of the shaft when the product dispensing device is empty. The locking means prevents the rotation of the shaft by blocking the path of at least one of the cams so that the shaft may not rotate and the cams cannot engage their respective separator doors.

The product dispensing device of the present invention may also include a coin operated turning means for rotating the shaft for vending the products stored in the device of the present invention.

OBJECTS OF THE PRESENT INVENTION

It is an object of the present invention to provide an improved product dispensing and storage device for storing and dispensing rollable products such as canned beverages or other cylindrical or spherical products that is simple, inexpensive and easy to use.

It is another object of the present invention to provide an improved product dispensing and storage device for storing and dispensing rollable products such as canned beverages or other cylindrical or spherical articles having increased reliability and cost effectiveness.

It is yet another object of the present invention to provide an improved product dispensing and storage device for storing and dispensing rollable products that does not damage or injure the product to be dispensed.

It is still another object of the present invention to provide an improved product dispensing and storage device for storing and dispensing rollable products having a dispensing mechanism with a rotating shaft means that is positioned at a sufficient angle with respect to the feed path to ensure delivery of the products undamaged by dispensing mechanisms.

It is a further object of the present invention to provide an improved product dispensing and storage device for storing and dispensing rollable products having an improved locking mechanism for preventing the operation of the device when it is empty.

It is yet another object of the present invention to provide an improved product dispensing and storage device for storing and dispensing rollable products that is less likely to jam.

These and other objects of the present invention shall be more clear upon review of the following detailed description of the preferred embodiment when reviewed in conjunction with the accompanying drawings.

BRIEF DESCRIPTION OF THE DRAWINGS

FIG. 3A is a side elevation schematic diagram to show the dispensing mechanism of the product dispensing and storage device of the present invention.

FIG. 3B is a schematic diagram to show the cam configuration of the dispensing mechanism shown in FIG. 3A.

FIG. 4A is a side elevation schematic diagram to show the dispensing mechanism of the product dispensing and storage device of the present invention.

FIG. 4B is a schematic diagram to show the cam configuration of the dispensing mechanism shown in FIG. 3A.

FIG. 5A is a side elevation schematic diagram to show the dispensing mechanism of the product dispensing and storage device of the present invention.

FIG. 5B is a schematic diagram to show the cam configuration of the dispensing mechanism shown in FIG. 5A.

FIG. 6A is a side elevation schematic diagram to show the dispensing mechanism of the product dispensing and storage device of the present invention.

FIG. 6B is a schematic diagram to show the cam configuration of the dispensing mechanism shown in FIG. 6A.

FIG. 7 is a top plan cross sectional view taken along lines 7—7 of FIG. 2.

FIG. 8 is a front elevational view taken along lines 8—8 of FIG. 7.

FIG. 9 is a front elevational view taken along lines 9—9 of FIG. 7.

DETAILED DESCRIPTION OF THE DRAWINGS

Figure 1:
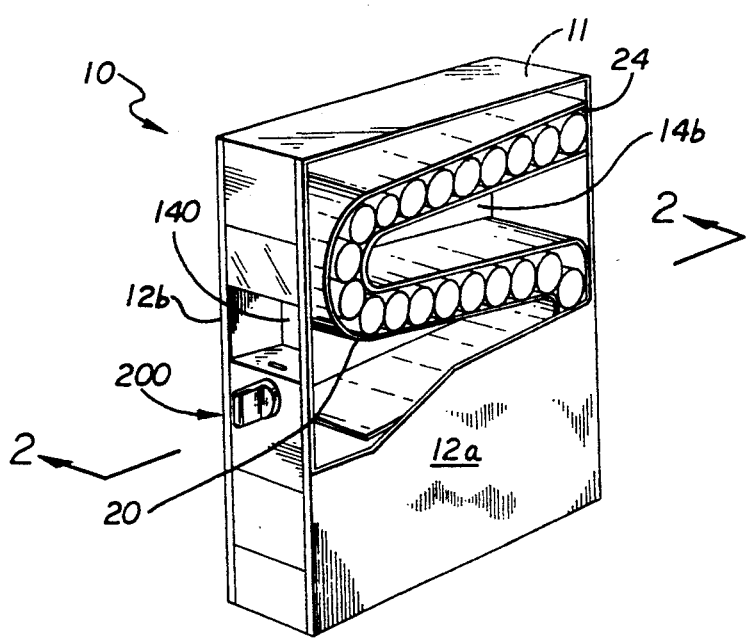
FIG. 1 is a fragmentary perspective view of the product dispensing and storage device of the present invention.
Figure 2:
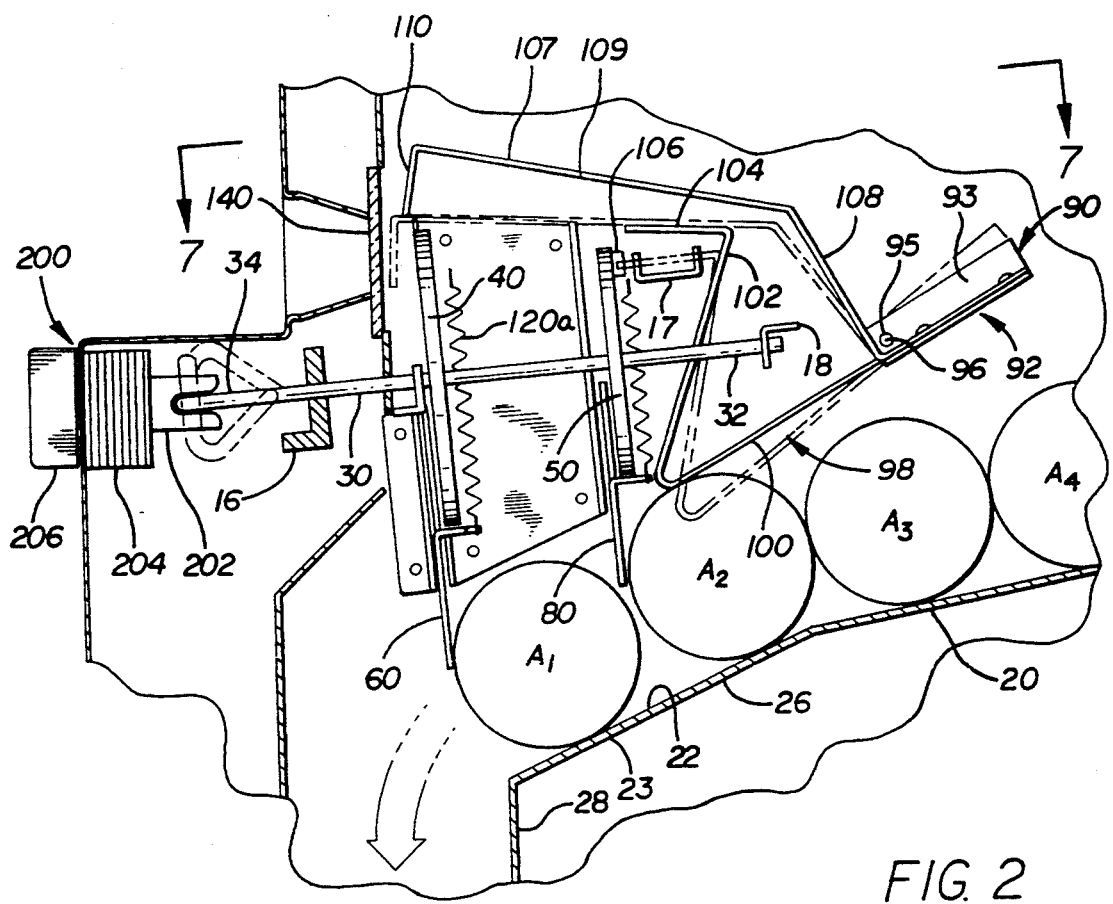
FIG. 2 is a cross sectional view along lines 2—2 of FIG. 1.

Referring to FIGS. 1 and 2, a product dispensing and storage device made in accordance with the present invention is generally referred to by the number 10. The dispensing device 10 comprises of a housing 11 having a pair of identical supporting side walls 12a and 12b each having an inner surface 14a and 14b respectively. Side walls 12a and 12b are connected at their inner surfaces 14a and 14b by front connecting bracket 16, middle connecting bracket 17 and rear connecting bracket 18. Connecting brackets 16, 17 and 18 may be secured to side walls 12a and 12b by brazing, soldering, riveting or other known means for securing pieces of metal. A serpentine feed path 20 for supporting a plurality of rollable articles $A_1 \ldots n$ is disposed within the housing 11 between side walls 12a and 12b. The feed path 20 has an article supporting surface 22, a bottom surface 23, an article receiving end 24 and an article discharge end 26.

Referring to FIG. 3A, the feed path 20 is attached to the inner surfaces 14a and 14b of the side walls 12a and 12b and is supported by tabs 27 that extend from the feed path 20. Tabs 27 may be affixed to the inner surfaces 14a and 14b in any conventional fashion such as by soldering, brazing, by means of appropriate adhesives or with screws or rivets. At the article discharge end 26, the feed path 20 has a down turned lip 28 for guiding the articles $A_1 \ldots n$ through the article discharge end 26. The article supporting surface 22 of the feed path 20 is positioned at a raised angle with respect to the horizontal so as to permit the articles $A_1 \ldots n$ to be dispensed to roll downward toward article discharge end 26 under the influence of gravity as a result of the inclination of the feed path 20.

Proximate to the article discharge end 26 is a rotatable shaft 30 having a distal end 32 and a proximal end 34. The shaft 30 is disposed horizontally and extends longitudinally in the direction of, but at an angle to, at least a portion of the feed path 20. In the preferred embodiment, the angle between the shaft 30 and the feed path 20 prior to the discharge end 26 is approximately 10 degrees, but may range from approximately 5 to 15 degrees. The discharge end 26 is sloped steeper than the rest of the feed path 20 so that the angle between the discharge end 26 and the shaft 30 is approximately 25 degrees. However, it is appreciated that the angle may be greater or less than 25 degrees, such as, but not limited to, the range of 10 to 35 degrees, depending on the size and weight of the product being dispensed by the dispensing device 10 and depending of function between the product being dispensed and the supporting surface of the discharge end 26 of the feed path 20. The distal end 32 of the shaft 30 is supported by rear connecting bracket 18 and front connecting bracket 16 supports the shaft 30 near its proximal end 34.

Referring to FIGS. 2 and 3B, near the proximal end 34 of the shaft 30 is a primary cam 40 having an asymmetric circumference, an opening 42, a rounded edge 44 and a flat edge 46. Primary cam 40 is secured by welding, brazing or other suitable known means to the shaft 30 which passes through opening 42 of the primary cam 40. The primary cam 40 is secure to the shaft 30 at a point near the article discharge end 26 of the feed path 20 and rotates with the shaft 30.

Located distally from the primary cam 40 is a secondary cam 50 which is sufficiently spaced along the shaft 30 at a distance from the primary cam 40 so as to accommodate a single article $A..._n$ therebetween. The secondary cam 50 has an opening 52 through which the shaft 30 passes and attaches to the secondary cam 50 and rotates with the shaft 30. Secondary cam 50 has an asymmetric circumference with a rounded edge 54 and a flat edge 56.

Referring to FIGS. 7 and 8, corresponding in position with the primary cam 40 is a sliding primary separator door 60 having side guide extensions 62 and 63, an article contact surface 64, a cam contact surface 66 and hook openings 68 and 69. The article contact surface 64 is blunt and has no sharp edges so that the primary separator door 60 cannot damage or injure an article $A_1 ..._n$ the event that the article contact surface 64 should make contact with an article $A_1 ..._n$. Cam contact surface 66 is flat so as to provide a suitable surface for engaging the rounded edge 44 of primary cam 40. Primary separator door 60 is located near the discharge end 26 of the feed path 20 and serves to block the path of the rollable articles when it is in its normal resting state.

The primary separator door 60 slides up and down in response to the movement of the primary cam 40 and is guided by primary guide rails 70 which are formed between the guide ridge 72 of front guide bracket 73 and the guide ridge 74 of middle guide bracket 75 which are secured to the inner surfaces 14a and 14b of the side walls 12a and 12b. Secondary guide rails 77 are formed between the guide ridge 76 of middle guide bracket 75 and the guide ridge 79 of the rear guide bracket 78 which are also secured to the inner surfaces 14a and 14b of the side walls 12a and 12b.

Referring to FIG. 9, corresponding in position with the secondary cam 50 is a sliding secondary separator door 80 having side guide extensions 82 and 83, an article contact surface 84, a cam contact surface 86 and hook openings 88 and 89. The article contact surface 84 of the secondary separator door 80 is identical in shape and in function to the article contact surface 64 of the primary separator door 60. The cam contact surface 86 is flat so as to provide a surface suitable for engaging the rounded edge 54 of secondary cam 50. Secondary separator door 80 is spaced from the primary separator door 60 to accommodate a single article $A_1 ..._n$ therebetween. The secondary separator door 80 serves to restrain the next in line article $A_2$ and any of the remaining articles $A_3 ..._n$ in the feed path 20 as the first article $A_1$ at the discharging end 26 of the feed path is discharged when the primary separator door 60 is raised. In its resting state, the secondary door 80 is raised so as not to restrain the articles $A_1 ..._n$ in the feed path 20.

The side guide extensions 62 and 63 of primary separator door 60 are slidably fitted and held between the primary guide rails 70, to guide the movement of the primary separator door 60. The side guide extensions 82 and 83 of secondary separator door 80 are slidably fitted and held between the secondary guide rails 77, to guide the movement of the secondary separator door 80.

Referring still to FIGS. 8 and 9, the movement of primary separator door 60 and the secondary separator door 80 is controlled by primary springs 120a and 120b and secondary springs 130a and 130b, respectively. Primary springs 120a and 120b are identical and have a bottom hook 122 and a top hook 124. The top hooks 124 attach to the top portion of side walls 12a or 12b at tabs 125. The bottom hooks 122 engage the hook openings 68 and 69 of the primary separator door 60. Similarly, the secondary springs 130a and 130b are also identical and have bottom hooks 132 and top hooks 134. The top hooks 134 are attached to the middle connecting bracket 17 through openings 135. The bottom hooks 132 engage the hook openings 88 and 89, of the secondary separator door 80.

Referring to FIGS. 2 and 7, the preferred embodiment of the present invention includes a locking system 90 for preventing the rotation of the shaft 30 when the dispensing device 10 is empty. The locking system 90 comprises of a flat member 92 having sides 93 and 94 and openings 95. The flat member 92 is disposed between the parallel side walls 12a and 12b behind the rear connecting bracket 18. A rod 96 passes through the openings 95 in the sides 93 and 94 and is supported by through openings (not shown) in each of the side walls 12a and 12b to support the flat member 92.

Extending from the flat member 92 is a bottom arm 98 that is substantially "Z"-shaped having a lower segment 100 that is parallel to the plane Of the flat member 92, an intermediate segment 102 that is angled upward at approximately 45 degrees to the lower segment 100 and an upper segment 104 that is parallel to the lower segment 100. The lower segment 100 is positioned so that it contacts an article $A_2$ present on the feed path 20. When an article $A_2$ is present on the feed path 20, the bottom arm 98 is supported in the raised positioned by article A as shown in Figure 2. When the feed path 20 is empty, the bottom arm 98 is the lowered positioned as shown in hidden lines in FIG. 2.

The upper segment 104 extends across the middle connecting bracket 17 towards and is proximate to the secondary cam 50 but does not reach the secondary cam 50. The middle connecting bracket 17 has a notch 15 therein for receiving and accommodating the upper segment 104 of the bottom arm 98 therein. Extending from the secondary cam 50 is a locking member 106 positioned to correspond with and engage the upper segment 104 of the bottom arm 98. When the feed path 20 contains at least one article to be dispensed (shown as $A_2$ in FIG. 2) thereon, the bottom arm 98 is in the raised position so that the upper segment 104 cannot engage the locking piece 106 and the secondary cam 50 may rotate freely. When the feed path 20 is empty, the bottom arm 98 is in the lowered position and the upper segment 104 is seated in notch 15 of middle connecting bracket and engage the locking member 106 to prevent the rotation of the secondary cam 50.

Also extending from the flat member 92 is top arm 107 having a perpendicular segment 108 and an angled segment 109 that extends forward past the primary cam 40. The angled segment 109 impedes the rotation of the primary cam 40 when the feed path 20 is empty by blocking the flat edge 46 of the primary cam 40 as shown in hidden lines in FIG. 2. When an article to be dispensed is present on the feed path 20, the upper arm 107 is raised so that the primary cam 40 may rotate freely.

At the end of the top arm 107 is an end member 110 which is at a right angle to the angled segment 109 and depends from the top arm 107. The flat member 110 may be used to indicate that the dispensing device 10 is empty to a consumer by displaying indicia through the display window 120.

Therefore when the feed path 20 contains at least one article to be dispensed, the locking system 90 is deactivated because the lower segment 100 of bottom arm 98 contacts and is raised by an article $A_2$ present the feed path 20 causing the flat member 92 of the locking system 90 to pivot about the rod 96 and raise the bottom arm 98 and the top arm 107 so that the upper segment 104 does not engage the locking member 106 and the top arm 107 is also raised so that angled segment 109 does not impede the path of rotation of the primary cam 40.

In the preferred embodiment, the dispensing device 10 of the present invention also includes a coin operating system 200 that is well-known in the art and readily available commercially. The coin operating system 200 comprises a shaft engaging bracket 202, a coin receiving slot 204, a knob 206 and a coin. When coins are placed within the coin slot 204 the internal mechanism of the coin lock 208 permits a user to rotate the knob 206 and thus rotate the shaft 30. It is appreciated that the dispensing device 10 may be embodied without a coin operating system 200.

The dispensing device 10 is operated in the following manner: The articles $A_1 \ldots n$ to be dispensed are placed in the device 10 at the article receiving end 24 of the feed path 20. At least one of the articles $A_1 \ldots n$ to be dispensed must be near the discharge end 26 of the feed path and rest against the secondary separator door 80. To dispense an article, knob 206 is turned to rotate the shaft 30. If the dispensing device has a coin operating system 200, coins are placed in coin slot 204 before rotating the knob 206. As the shaft 30 is rotated, the cams 40 and 50 simultaneously rotate with the shaft 30 so that the flat edges 46, 56 and rounded edges 44, 54 turn in sequential positions for controlling the respective positions of the primary and secondary separator doors 60 and 80.

Referring to FIGS. 3A and 3B, a complete dispensing cycle begins with the primary separator door 60 being held down in its normal closed position to block the articles $A_1 \ldots n$ in the feed path 20 by the rounded edge 44 of primary cam 40 and the secondary separator door 80 also being held in its normal closed position to block the article in the feed path 20 by the rounded edge 54 of secondary cam 50.

Referring to FIGS. 4A and 4B, as the shaft 30 is rotated one quarter ($\frac{1}{4}$) of a turn, the primary separator door 60 is held in its normal closed position by the rounded edge 44 primary cam 40, and the secondary cam 50 releases the secondary separator door 80 as the flat edge 56 comes into contact with cam contact surface 86 so that the secondary separator door 80 is raised by the springs 130a and 130b. The article $A_1$ nearest to the secondary separator door 80 is released so that it rolls down the feed path 20 to rest against the primary separator door 60. The space between the secondary separator door 80 and the primary separator door 60 accommodates only one article therebetween.

Referring to FIGS. 5A and 5B, as the shaft 20 is rotated one half ($\frac{1}{2}$) of a turn, the primary separator door 60 still remains in its closed position, being held down by the rounded edge 44 of the primary cam 40 and the secondary separator door 80 is moved back down and held in the lowered, closed position by the rounded edge 54 of the secondary cam 50 so as to once again block the articles $A_2 \ldots n$ in the feed path 20.

Referring to FIGS. 6A and 6B, as the shaft 30 is rotated three quarters ($\frac{3}{4}$) of a turn, the flat edge 46 of the primary cam 40 comes into contact with cam contact surface 66 so that the primary cam 40 releases the primary door 60 and the primary door 60 is raised by the springs 120a and 120b. The article A nearest to the discharge end 26 of the feed path 20 is released from the feed path 20, while the secondary door 80 remains held in its closed position by the rounded edge 54 of secondary cam 50 to hold and restrain the next in line article $A_2$ and any other articles $A_3 \ldots n$ behind article $A_2$ to prevent them from being discharged.

As the shaft 30 is rotated a complete turn, the primary and secondary separator doors 60 and 80 are restored to their normal lowered closed positions and the device 10 is ready to dispense another article shown in FIGS. 3A and 3B.

While the present invention has been described in detail with regards to the preferred embodiment it is appreciated that other variations of the present invention may be devised which do not depart from the inventive concept of the present invention.

For example, an alternative embodiment of the present invention would include a motorized means for rotating the shaft 30 of the present invention.

Another alternative embodiment of the dispensing device that is within the scope of the present invention would include use of more than one feed path and dispensing mechanism, each for dispensing a different type of product contained within the same dispensing device.

Yet another embodiment of the present invention would include a refrigeration means for storing the articles to be dispensed at a temperature that is different than the ambient temperature in which the device is located.

What is claimed is:

1. A product dispensing and storage device for storing and dispensing rollable articles, comprising:
   article supporting means for rollably supporting a plurality of said articles, said article supporting means having a receiving end and a discharging end for dispensing said articles;
   shaft means rotatable through a plurality of rotational positions, said shaft means being located proximate to said discharging end;

a primary cam member having an asymmetrical circumference responsive to the rotation of said shaft means;

a secondary cam member having an asymmetrical circumference responsive to the rotation of said shaft means;

a primary separator member adjacent to said discharging end for restraining articles on said article supporting means, said primary separator member having primary cam member engaging means so that when said primary cam member rotates in response to the rotation of said shaft means said primary separator member moves in relation to said article supporting means to restrain or release said article through said discharging end; and a secondary separator member for restraining articles on said storage means spaced from said primary separator member in a direction away form said discharging end, said secondary separator member having secondary cam member engaging means for engaging said secondary cam member so that when said secondary cam member rotates in response to the rotation of said shaft means said secondary separator member moves in relation to said article supporting means to restrain or release a next to be dispensed article adjacent to said article to be discharged.

2. The device of claim 1 in which said shaft means is disposed at an angle to said discharging end of said article supporting means 3. The device of claim 2 in which said angle is between 10 and 35 degrees.

4. The device of claim 1 in which said discharging end of said article supporting means has a first portion and a second portion, said first portion being at a steeper angle with respect to said shaft means than said second portion.

5. The device of claim 1 in which said primary separator member is spring biased.

6. The device of claim 1 in which said secondary separator member is spring biased.

7. The device of claim 1 in which said primary separator member and said secondary separator member are both spring biased.

8. The device of claim 1 in which said primary separator member and said secondary separator member move in a single plane.

9. The device of claim 1 in which said primary separator member and said secondary separator member move in a single plane that is perpendicular to said article supporting means.

10. The device of claim 1 in which said article supporting means includes at least one vertically disposed serpentine feed path having an upper end for receiving articles and a lower end for discharging articles.

11. The device of claim 1 including a self-locking means blocking the rotation of said shaft means said when said article supporting means is empty.

12. The device of claim 11 in which said self-locking means comprises a primary cam blocking means and a secondary cam blocking means.

13. The device of claim 1 in which said shaft means is coin operated.

* * * * *